Patented Feb. 4, 1936

2,029,738

UNITED STATES PATENT OFFICE 2,029,738

PROCESS FOR THE PRODUCTION OF ALKALI NITRATE

Philipp Osswald, Hofheim, and Walter Geisler, Frankfort-on-the-Main-Hochst, assignors to I. G. Farbenindustrie Aktiengesellschaft, Frankfort-on-the-Main, Germany No Drawing. Application March 29, 1935, Serial No. 13,786. In Germany April 7, 1934

4 Claims. (Cl. 23—102)

The present invention relates to a process for the production of alkali nitrate by the reaction of ammonium nitrate with alkali chloride in an aqueous solution.

It is known that the mixture of ammonium chloride and alkali nitrate obtainable by the reaction of alkali chloride with ammonium nitrate can be separated by mechanical means, for instance by elutriation. The success and usefulness of this method of mechanical separation depend to a large extent on the nature of the crystalline material and particularly on whether or not the components have grown together and whether the crystals of alkali nitrate form coarse particles.

The present invention is based upon the observation that for the most favorable formation of crystals there is but a small choice among the numerous concentrations of the solution in which it is possible to realize the reaction of alkali chloride with ammonium nitrate. At a temperature of the reaction which in each case is exactly defined only one single concentration of the salt components in the liquid in which the reaction occurs, yields the optimum formation of crystals. This concentration is the solution of the monovariants saturated with the three salts alkali nitrate, ammonium chloride and alkali chloride. In the following description this solution is termed the "three salt solution".

The pair of salts ammonium chloride and alkali nitrate forms, as is known, an incongruent solution, that is to say, on dissolving the pair in a small quantity of water, alkali chloride separates and the corresponding quantity of ammonium nitrate is formed. The three salt solution is analytically characterized by the fact that its content of dissolved ammonium nitrate depends only on the temperature. When alkali chloride is introduced, no reaction at first occurs, because the dissolved ammonium nitrate is in balance with the dissolved alkali chloride. This fact is the basis of the method herein described.

Ground alkali chloride is suspended, while stirring well, in the three salt solution. In this operation the alkali chloride may be introduced in one batch or it may be added in portions during the reaction. In any case care has to be taken, that the component alkali chloride is always present in excess during the reaction. In proportion as the counter component, the ammonium nitrate, is then added the reaction and in consequence thereof the crystallization of the alkali nitrate occurs. While the ammonium nitrate is added the crystallization can be regulated in the usual manner by gradually cooling the solution and coarse particles are thus obtained.

It has furthermore been found that it is unsuitable to cause the ammonium nitrate to react in the solid condition. Preferably it is dissolved previously in the three salt solution, the temperature of which is advantageously raised by about 10–20° in order to avoid precipitation; in this dissolved condition the ammonium nitrate is passed into the crystallizing vats which are provided with an effective stirring device in order to maintain in a good suspension the alkali chloride which has been introduced, as well as the products of the reaction, alkali nitrate and ammonium chloride, and to cause the ammonium nitrate added to act upon the entire quantity of alkali chloride.

It is advisable continuously to remove during the reaction the heat of crystallization by means of cooling coils so that the crystallization occurs at substantially constant temperature. This temperature substantially lies at room temperature or somewhat above and it automatically corresponds with the temperatures of the different seasons.

Finally, it has been found that it is advantageous for the quality of the crystalline material to suspend, during the crystallization, an abundant quantity of crystals of alkali nitrate in the liquor, and to recover them. Before the beginning of a new reaction it is, therefore, advisable to suspend a large portion of coarse-grained alkali nitrate in the crystallizing vat. This precaution is not satisfied with the addition of a few crystals from a previous batch, because an addition of small quantities of alkali nitrate has no effect upon the size of grain of the alkali nitrate produced.

After the quantity of alkali chloride present has been transformed completely into alkali nitrate, the concentration of ammonium nitrate rises, of course, beyond the composition of that present in the three salt solution if a further quantity of liquor containing ammonium nitrate is added. This can easily be proved by an analytical process. The salt mixture of alkali nitrate and ammonium chloride is now ready for the mechanical separation.

The following example serves to illustrate the invention but it is not intended to limit it thereto:

The three salt solution required for the transformation of sodium chloride into sodium nitrate has the following composition when used at 20° C. for 1000 kilos of water about 1010 kilos of sodium nitrate, 370 kilos of ammonium chloride and 370 kilos of ammonium nitrate. This solution is obtained automatically by dissolving sodium nitrate and ammonium chloride until saturation has occurred. During this operation sodium chloride separates so that the solution is saturated in the required manner with sodium nitrate, ammonium chloride and sodium chloride and leaves unaltered any further quantities of these substances which may be introduced.

Into a vessel provided with a stirring device and a cooling coil and having a capacity of 12 cubic meters there are introduced 3 cubic meters of three salt solution of the above described composition and there are then added about 1 ton of coarse soda saltpeter and 1 ton of ground sodium chloride. No crystallization of alkali nitrate may occur at this stage. By vigorously stirring, these additional substances are finely suspended in the three salt solution. A three salt solution heated to about 10-20° C. above room temperature and containing ammonium nitrate in a dissolved condition is then caused to run in a slow current (about 1 cubic meter per hour) into the suspension so that about 600 kilos of ammonium nitrate are introduced into the reaction per hour. After the first and second hour there is added each time 1 ton of rock salt so that as a whole 3 tons of sodium chloride are transformed into 4.4 tons of sodium nitrate and 2,7 tons of ammonium chloride. After about 6 hours the required quantity of ammonium nitrate has been added and the conversion of the sodium chloride is thus finished. The termination of the reaction can be recognized either microscopically or analytically by testing the content of ammonium nitrate in the lyes. There are thus obtained crystals of sodium nitrate having a size of grains of 1 to 2 mm. The crystals can be separated from the ammonium chloride excellently in known manner.

We claim:

1. In the production of alkali nitrate by the reaction of ammonium nitrate with alkali chloride in an aqueous solution the step which comprises suspending the alkali chloride in a lye saturated with alkali nitrate, ammonium chloride and alkali chloride and adding to the suspension of alkali chloride the ammonium nitrate dissolved in a lye of the same composition.

2. In the production of alkali nitrate by the reaction of ammonium nitrate with alkali chloride in an aqueous solution the step which comprises suspending the alkali chloride in a lye saturated with alkali nitrate, ammonium chloride and alkali chloride and adding to the suspension of alkali chloride the ammonium nitrate dissolved in a lye of the same composition, the reaction being carried out while stirring and cooling.

3. In the production of alkali nitrate by the reaction of ammonium nitrate with alkali chloride in an aqueous solution the step which comprises suspending the alkali chloride in a lye saturated with alkali nitrate, ammonium chloride and alkali chloride and adding to the suspension of alkali chloride the ammonium nitrate dissolved in a lye of the same composition, the reaction being carried out at room temperature.

4. In the production of alkali nitrate by the reaction of ammonium nitrate with alkali chloride in an aqueous solution the step which comprises suspending the alkali chloride in a lye saturated with alkali nitrate, ammonium chloride and alkali chloride and adding to the suspension of alkali chloride the ammonium nitrate dissolved in a lye of the same composition, large quantities of coarse-grained alkali nitrate being maintained in suspension in the reaction lye before the beginning and during the reaction.

PHILIPP OSSWALD.
WALTER GEISLER.